F. T. ROBERTS.
METHOD OF AND APPARATUS FOR MAKING HOLLOW RUBBER ARTICLES.
APPLICATION FILED JUNE 24, 1918.
1,310,440.
Patented July 22, 1919.
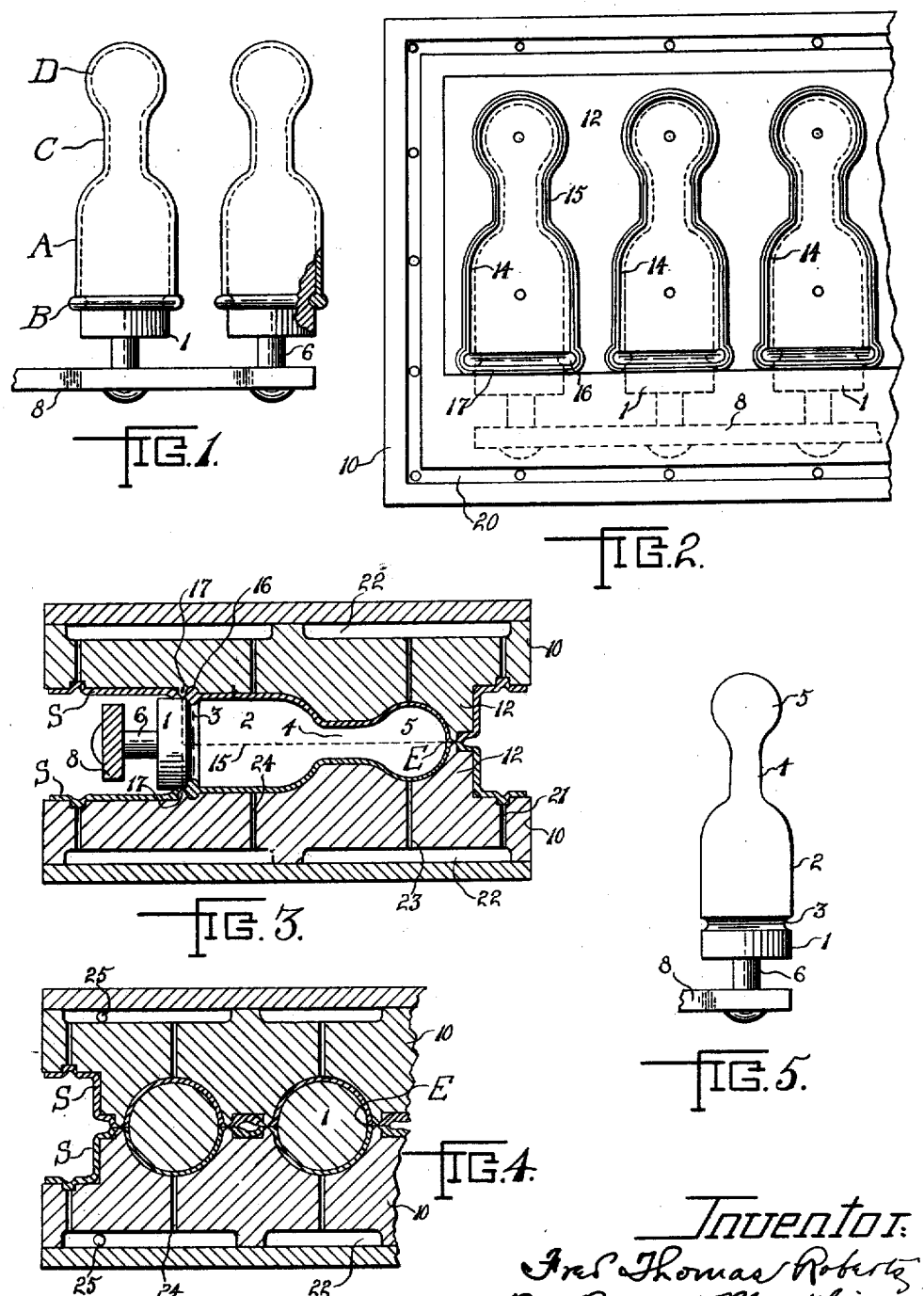

UNITED STATES PATENT OFFICE.

FRED THOMAS ROBERTS, OF CLEVELAND, OHIO, ASSIGNOR TO THE PARAMOUNT RUBBER COMPANY, OF CLEVELAND, OHIO, A CORPORATION OF OHIO.

METHOD OF AND APPARATUS FOR MAKING HOLLOW RUBBER ARTICLES.

1,310,440.      Specification of Letters Patent.      Patented July 22, 1919.

Application filed June 24, 1918. Serial No. 241,465.

*To all whom it may concern:*

Be it known that I, FRED THOMAS ROBERTS, a citizen of the United States, residing at Cleveland, in the county of Cuyahoga and State of Ohio, have invented a certain new and useful Improvement in Methods of and Apparatus for Making Hollow Rubber Articles, of which the following is a full, clear, and exact description, reference being had to the accompanying drawings.

This invention relates to the formation of hollow rubber articles having an opening through which an interior form or mandrel may be removed. An object of the invention is to provide a simple, economical process which may effectively accomplish the rapid production of such articles. Still another object is the provision of mold members and like apparatus for advantageously carrying out the process.

My invention is hereinafter more fully described in connection with the accompanying drawings and the essential characteristics are summarized in the claims.

Referring to the drawings, Figure 1 illustrates a plurality of nursing nipples mounted on mandrels which are shown as carried on a single support; Fig. 2 illustrates one of the mold members for forming the article from flat sheets; Fig. 3 is a vertical section taken longitudinally through one of the articles illustrating one of the molds in a position brought together over the mandrels; Fig. 4 is a section through the same taken at right angles to Fig. 3; Fig. 5 illustrates one of the mandrels after the article has been removed.

To illustrate this invention conveniently, I have shown a nursing nipple, as an example of an article in the making of which this invention has been found useful. The nipple as shown is of the type having a body portion A, terminating at its open end B and having a contracted neck C, integral with an enlargement in the nature of a readily compressible spherical bulb D. In forming this article by my process, a comparatively thin sheet of rubber is laid over each of the two mold plates having registering cavities surrounded by cutting edges adapted to sever the rubber from the surrounding sheet. The rubber is clamped over the mold cavities by any suitable means and is forced into the cavities by pneumatic pressure. A mandrel having a contour corresponding to the inner surface of the article is then placed in one of the cavities lined with rubber and the molds are brought together to sever the sheet leaving the rubber around the cavity with its meeting edges joined. The molds may then be separated and the article removed, on the mandrels, and vulcanized while on the mandrels without the use of exterior vulcanizing molds or any confining means fitting the outside of the article.

That the process may be better understood, I will now describe the apparatus illustrated.

Mandrels 1 are shaped to fit the interior of the nipples, and complementary to the surface of the mold cavities but slightly smaller to allow for the thickness of the rubber. The mandrel body has a substantially cylindrical surface at 2, meeting a groove 3 formed in this surface and curved inwardly to a neck portion 4, which carries a substantially spherical member 5, adapted to fit the interior of the bulb B. These mandrels are shown as mounted on pegs 6 secured to a substantially straight bar 8. The bar may carry any desired number of these mandrels whereby they may be conveniently placed simultaneously into a corresponding number of mold cavities and be readily removed with the articles thereon and transferred to a vulcanizing chamber where suitable holders are provided for mounting a large number of such bars and mandrels.

The mold members are indicated at 10, as comprising rectangular body portions carrying integral raised portions 12 in which the cavities 14 are formed. These cavities are adapted to form one half an article so that when registering cavities are brought together, the halves may be united along the meeting edges. To insure the uniting of the edges and to sever the material within the cavities from the surrounding sheet, indicated at S, I provide raised knife edges 15 extending around the cavities from the grooves 16 which form the outer portion of the bead B. To sever the nipple at its open end from the sheet, I extend this knife at 17 in a semi-circular course substantially at the outer edge of the bead and adapt it to coact with the mandrel just below or outside of the groove 3.

Extending entirely around the edge of the mold plate is a groove 20 which I may term a vacuum clamping groove. Passages 21 leading from this groove and communicating with a chamber 22 may be exhausted of air by any satisfactory means (connected at the suction opening 25) such as shown, for example, in my prior Patent No. 1,201,502 to draw the rubber into this groove, securely hold it in position and prevent it from wrinkling as it is drawn into the cavities by the application of vacuum communicated to the cavities 14 through passages 23 and 24. In presenting the rubber sheet to each mold member, it is only necessary to insure a contact of the rubber with the mold plates in such manner as to close the grooves 20 until the vacuum may be applied to the chambers 22 whereby the sheet may be held until drawn in the cavities as illustrated in Figs. 3 and 4.

Assuming that the rubber is drawn into the cavities, the mandrels on the bar 8 are now simultaneously placed into the lower cavities and the mold members then forcibly brought together by the use of any suitable means, such for example, as a hydraulic press. This results in causing the uniting of the rubber sheets at the meeting edges as indicated at E and at the same time causes the knives 17 to force rubber laterally each way from the knife resulting in filling the grooves 3 and 16, thus forming the bead. As these knives 17 meet the surface of the mandrel 1, they complete the severing of the rubber sheet entirely around the nipple. The molds may then be separated and the mandrels removed and transferred to a vulcanizing chamber, while the raw rubber sheet remaining on the mold plates may be removed and new sheets placed in position to repeat the operation.

After subjecting the nipples to the proper amount of heat to complete their vulcanization, they are preferably removed from the mandrels by turning them inside out which brings the seam or edge formed by the knives on the inside of the finished article while the exterior of the finished article is that surface formed by the smooth surface of the mandrel.

It is obvious that a comparatively large number of articles on forming mandrels carried by bars, as described, may be placed in a vulcanizing chamber of given size, resulting in an economy of heat which is very marked when compared with the heat required to vulcanize such articles when on the inside of heavy metallic vulcanizing molds.

Having thus described my invention, what I claim is:

1. The method of forming hollow rubber articles, consisting of seating rubber stock in cavities in two mold members, bringing such rubber lined cavities into conjunction about a mandrel, severing the stock and automatically joining it adjacent to edges of the cavities and also severing the stock transversely against the mandrel.

2. The method of making hollow rubber articles consisting of pressing about a mandrel two mold members having cavities in which rubber stock has been seated and having co-acting knife edges which come together to sever the stock about a portion of the article, and other knife edges which coact with the mandrel, and thereafter vulcanizing the formed article.

3. The method of making hollow rubber articles, consisting of seating rubber stock in cavities in two mold members, bringing such rubber lined cavities into conjunction about a mandrel, severing the stock and automatically seaming it adjacent to edges of the cavities and also severing the stock transversely against the mandrel, and thereafter vulcanizing the formed article while on the mandrel.

4. The method of forming a hollow rubber article, consisting of pneumatically seating sheet rubber in each of two coacting mold cavities, bringing the mold members together (with the rubber seated therein) about a mandrel, and vulcanizing the article while on the mandrel.

5. The process of forming a hollow rubber article, consisting of pneumatically seating raw rubber stock in coacting mold cavities, bringing the cavities carrying the rubber together about a mandrel, cutting off surplus stock by beveled ribs about the edges of the cavities, and vulcanizing the article, while on the mandrel.

6. The process of forming a hollow rubber article, consisting of pneumatically seating raw rubber stock in coacting mold cavities, bringing the cavities carrying the rubber together about a mandrel, and vulcanizing the article thus formed on the mandrel without the use of exterior confining means.

7. The process of forming a hollow rubber article, consisting of pneumatically seating rubber stock in coacting mold cavities, bringing the mold members together about a mandrel to cause the rubber to unite at its meeting edges and thus form the article about the mandrel, removing the mandrel and subjecting the article thereon to vulcanizing heat, then removing the article from the mandrel, turning the article inside out.

8. The process of forming a nursing nipple or like article, consisting of pneumatically seating raw rubber sheets in mold cavities, placing a mandrel in one of such cavities and bringing the mold members together to form the article about the mandrel and simultaneously severing the stock from the surrounding sheet leaving the article formed on the mandrel, and vulcanizing the article while on the mandrel.

9. The process of forming a nursing nipple or similar article, consisting of pneumatically forcing rubber sheets in coacting mold cavities, bringing the mold members together about a mandrel occupying the rubber lined cavities, simultaneously severing the seated rubber from the sheets by coacting knife edges meeting as the molds are brought together and knife edges meeting the mandrel.

10. The process of making a nursing nipple or similar article, consisting of pneumatically forcing raw rubber sheets in coacting mold cavities, bringing the mold members together about a mandrel occupying the rubber lined cavities, simultaneously severing the seated rubber from the sheets by coacting knife edges meeting as the molds are brought together and knife edges meeting the mandrel, then separating the mold and removing the mandrel with the article thereon, and vulcanizing the article while on the mandrel.

11. The process of forming a nursing nipple or similar article having a bead at its open end, consisting of pneumatically seating rubber stock in the coacting mold cavities, bringing the cavities together about a forming mandrel, there being a groove in the mandrel and knife edges coacting with the mandrel adjacent such groove which sever the rubber on the mandrel from the surrounding stock while at the same time rubber is pressed into the groove to form the bead.

12. The process of forming a nursing nipple or similar article having a bead at its open end, consisting of pneumatically seating rubber stock in the coacting mold cavities, bringing the cavities together about a forming mandrel having an annular groove, there being knife edges on the mold members about the sides and head of the cavity and concave knife edges coacting with the mandrel adjacent to its groove, whereby the rubber about the mandrel is severed from the surrounding stock and at the same time a portion of it forced into the groove.

13. The process of making a nursing nipple or similar article having a bead at its open end, consisting of pneumatically seating raw rubber stock in the coacting mold cavities, bringing the cavities together about a forming mandrel having an annular groove, there being knife edges on the mold members about the sides and head of the cavity and concave knife edges coacting with the mandrel adjacent to its groove, whereby the rubber about the mandrel is severed from the surrounding stock and at the same time a portion of it forced into the groove, and thereafter vulcanizing the article while on the mandrel.

14. A mold for making hollow rubber articles consisting of a pair of coacting mold members having registering cavities and a mandrel adapted to occupy the cavities, knife edges formed on the mold members about a portion of the cavities and adapted to coact with each other, and other knife edges extending crosswise of the others and adapted to coact with the mandrel.

15. A mold for making hollow rubber articles comprising two coacting mold members, each having registering cavities in the face thereof and each having a beveled cutting rib about the sides and head of the cavity which rib has its edge tangent to the plane of separation of the mold members, other cutting ribs on the mold members lying within the cavities thereof and extending transversely, and a mandrel adapted to occupy the cavities when lined with rubber stock and furnish the member against which the transverse cutting ribs act.

16. A mold for making nursing nipples or similar articles, consisting of a pair of coacting members having registering cavities, knife edges about the cavities and adapted to meet when the molds are brought together and transverse knife edges corresponding to the end of the nipple, and a mandrel adapted to occupy the mold and coact with the last mentioned knife edges, whereby part of the article may be united at the edges and the whole article severed from the surrounding stock.

17. A mold for making nursing nipples or similar articles consisting of a pair of coacting members having registering cavities, a mandrel adapted to occupy said cavities, an annular groove formed in the mandrel, and a transverse knife edge in each of the mold members adapted to sever the rubber adjacent to the groove.

18. A mold for making nursing nipples or similar articles, consisting of a pair of coacting members having registering cavities, knives about the cavities and adapted to meet when the molds are brought together and knives at the open ends of the cavities corresponding to the end of the nipple, and a mandrel adapted to enter the nipple and coact with the last mentioned knives, said mandrel having an annular groove and the mold members having coöperating grooves located adjacent to and parallel with the last mentioned knives.

19. An apparatus for making nursing nipples or similar articles, consisting of mold plates each having a plurality of cavities adapted to register when the plates are brought together, and a plurality of mandrels adapted to enter such cavities and carried on a support and spaced correspondingly to the cavities, the mold having passages whereby stock may be pneumatically seated.

20. The method of making hollow rubber articles closed at one end and open at the other and having a bead about the open end consisting of forming the article about a mandrel having a groove corresponding to said bead and squeezing some of the material into the groove, and thereafter severing the article at the base of the bead.

21. The method of making hollow rubber articles closed at one end and open at the other and having a bead about the open end consisting of forming the article in a mold having a groove on the outside of the article positioned according to said bead, and squeezing some of the material into the groove, and thereafter severing the article at the base of the bead.

22. The process of making hollow articles consisting of placing sheets of plastic stock across the mouths of mold cavities, forming sections of the article in finished shape by pneumatically forcing the stock therefor against the walls of the cavities, thereafter bringing the mold members substantially together to press the edge portions of one sheet against the other, a member being interposed between the edges of the sheets, and curing the article while the member is in place.

23. The process of making a hollow rubber article consisting of pneumatically seating rubber stock in mold cavities, bringing two seated portions into conjunction with the edges in engagement and upon an interposed mandrel, severing parts of the stock against the mandrel, and thereafter vulcanizing the article with the mandrel in it.

24. The method of making hollow rubber articles consisting of pneumatically seating rubber stock in mold cavities, placing a mandrel in one of the cavities and bringing the two mold members together to join the parts in edge engagement, and thereafter vulcanizing the article.

25. The method of making hollow rubber articles consisting of pneumatically seating rubber stock in mold cavities, placing a mandrel in one of the cavities and bringing the two mold members together to join the parts in edge engagement, and at the same time shearing off some of the stock against the mandrel, then vulcanizing the article while on the mandrel.

26. The process of making hollow rubber articles comprising pneumatically forming the article, cutting it off against a mandrel, and vulcanizing it with the same mandrel.

In testimony whereof I hereunto affix my signature.

FRED THOMAS ROBERTS.

Copies of this patent may be obtained for five cents each, by addressing the "Commissioner of Patents, Washington, D. C."